(12) United States Patent
Inoue

(10) Patent No.: US 10,225,444 B2
(45) Date of Patent: Mar. 5, 2019

(54) MULTI-LENS OPTICAL APPARATUS

(71) Applicant: CANON KABUSHIKI KAISHA, Tokyo (JP)

(72) Inventor: Chiaki Inoue, Utsunomiya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/659,776

(22) Filed: Mar. 17, 2015

(65) Prior Publication Data

US 2015/0260965 A1 Sep. 17, 2015

(30) Foreign Application Priority Data

Mar. 17, 2014 (JP) .................................. 2014-052919

(51) Int. Cl.
*G02B 3/00* (2006.01)
*G03B 3/10* (2006.01)
(Continued)

(52) U.S. Cl.
CPC ......... *H04N 5/2254* (2013.01); *G02B 3/0043* (2013.01); *G02B 13/009* (2013.01);
(Continued)

(58) Field of Classification Search
CPC .............. G02B 13/0055; G02B 13/009; G02B 27/1066; G02B 7/021; G02B 13/0085;
(Continued)

(56) References Cited

U.S. PATENT DOCUMENTS 9,241,111 B1 * 1/2016 Baldwin ................ G03B 35/08
2004/0240052 A1 * 12/2004 Minefuji ............ G02B 13/0015
359/435
(Continued)

FOREIGN PATENT DOCUMENTS

JP  2001330878 A  11/2001
JP  2005020718 A   1/2005
(Continued)

OTHER PUBLICATIONS

Office Action issued in JP Appln. No. 2014-052919 dated Dec. 12, 2017.
(Continued)

*Primary Examiner* — Dennis A Hogue
(74) *Attorney, Agent, or Firm* — Rossi, Kimms & McDowell LLP

(57) ABSTRACT

The multi-lens optical apparatus includes multiple imaging optical systems configured to respectively form optical images of an object in mutually different areas on an image plane. The multiple imaging optical systems include imaging optical systems having mutually different focal lengths, and adjacent lenses included in the multiple imaging optical systems are integrally held, the adjacent lenses being mutually adjacent in a direction orthogonal to optical axes of the multiple imaging optical systems. Of the multiple imaging optical systems, a most wide-angle imaging optical system whose focal length is shortest includes a most object-side lens that is a meniscus lens having a negative optical power and having a convex surface toward an object side, and the convex surface is disposed at a most object-side position in the multiple imaging optical systems.

9 Claims, 8 Drawing Sheets

(51) Int. Cl.
*G02B 13/00* (2006.01)
*G02B 27/10* (2006.01)
*G03B 17/00* (2006.01)
*H04N 5/225* (2006.01)
*H04N 5/232* (2006.01)
*H04N 5/247* (2006.01)
*G02B 27/00* (2006.01)

(52) U.S. Cl.
CPC ..... *G02B 13/0055* (2013.01); *G02B 27/1066* (2013.01); *G03B 3/10* (2013.01); *G03B 17/00* (2013.01); *H04N 5/2258* (2013.01); *H04N 5/23296* (2013.01); *H04N 5/247* (2013.01)

(58) Field of Classification Search
CPC ....... G02B 3/006–3/0075; G03B 19/07; G03B 3/10; G03B 17/00; H04N 5/2254; H04N 5/2258; H04N 5/247; H04N 5/23238; H04N 5/23296
See application file for complete search history.

(56) References Cited

U.S. PATENT DOCUMENTS

| | | | | |
|---|---|---|---|---|
| 2005/0128335 A1* | 6/2005 | Kolehmainen | .... | G02B 13/0015 348/340 |
| 2006/0044634 A1* | 3/2006 | Gruhlke | ................ | H04N 1/486 358/505 |
| 2006/0187338 A1* | 8/2006 | May | ..................... | H04N 5/2254 348/375 |
| 2009/0295949 A1* | 12/2009 | Ojala | ................... | G02B 3/0018 348/240.99 |
| 2010/0208100 A9* | 8/2010 | Olsen | ................... | G02B 3/0062 348/227.1 |
| 2010/0328471 A1* | 12/2010 | Boland | ................ | G02B 13/004 348/207.99 |
| 2012/0307382 A1* | 12/2012 | Hsu | ..................... | G02B 13/0045 359/770 |
| 2013/0107376 A1* | 5/2013 | Tsai | ....................... | G02B 13/06 359/714 |
| 2013/0320195 A1* | 12/2013 | Wang | ................ | H01L 27/14627 250/208.1 |
| 2014/0002688 A1* | 1/2014 | Inoue | ................. | H04N 5/23296 348/222.1 |
| 2014/0016016 A1* | 1/2014 | Berestov | ............ | H04N 5/23212 348/345 |
| 2014/0160231 A1* | 6/2014 | Middleton | ......... | H04N 5/23238 348/36 |

FOREIGN PATENT DOCUMENTS

| | | |
|---|---|---|
| JP | 2005303694 A | 10/2005 |
| JP | 2005341301 A | 12/2005 |
| JP | 2014010399 A | 1/2014 |
| JP | 2014010400 A | 1/2014 |
| JP | 2014010401 A | 1/2014 |

OTHER PUBLICATIONS

Office Action issued in Japanese Appln. No. 2014-052919 dated May 15, 2018. English translation provided.

English translation of Office Action issued in Japanese Appln. No. 2014-052919 dated Dec. 12, 2017, previously cited in IDS filed Dec. 28, 2017.

* cited by examiner

MULTI-LENS OPTICAL APPARATUS

BACKGROUND OF THE INVENTION

Field of the Invention

The present invention relates to a multi-lens optical apparatus to be used to perform multi-view image capturing, such as an image capturing apparatus and a lens apparatus.

Description of the Related Art

As a type of image capturing apparatuses such as video cameras and digital cameras, a multi-lens image capturing apparatus is proposed which has multiple divided imaging optical systems to realize miniaturization of the apparatus. Such a multi-lens image capturing apparatus utilizing a compound-eye structure of eyes of insects has, as the multiple imaging optical systems, for example, a lens array constituted by multiple lenses having small diameters and short focal lengths, which makes it possible to miniaturize the apparatus.

However, for such a multi-lens image capturing apparatuses, it is conventionally difficult to include an optical zooming function of varying an image-capturing field angle. This is because, for the multi-lens image capturing apparatus, employing the optical zooming function of varying the image-capturing field angle by moving lenses constituting the imaging optical systems in an optical axis direction, requires a mechanism to move each lens of each divided imaging optical system, which results in an increase in size of the image capturing apparatus.

Japanese Patent Laid-Open No. 2005-303694 discloses a multi-lens image capturing apparatus which includes a short-focal-length lens and a long-focal-length lens whose field angles are mutually different and which performs image capturing of an object such that a same area of the object is captured through the short-focal-length and long-focal-length lenses. This multi-lens image capturing apparatus inserts a zoom-up image acquired from an image-capturing area of an image sensor corresponding to the long-focal-length lens into part of an image acquired from an image-capturing area of the image sensor corresponding to the short-focal-length lens. Moreover, Japanese Patent Laid-Open No. 2001-330878 discloses an image capturing apparatus which includes multiple fixed-focal-length lenses whose focal lengths are mutually different and in which an image sensor is moved to a position on an optical axis of one fixed-focal-length lens to be used for image capturing to vary an image-capturing field angle of the apparatus.

Furthermore, Japanese Patent Laid-Open No. 2005-341301 discloses a multi-lens image capturing apparatus including multiple lens systems (optical systems) whose focal lengths are mutually different and which are each constituted by a front lens unit and a rear lens unit. In this multi-lens image capturing apparatus, a distance from a most object-side lens surface of the multiple lens systems is set such that a field of view of each lens system is not obstructed by the other lens systems.

Japanese Patent Laid-Open No. 2005-303694 discloses a configuration in which zooming is realized by performing image processing on images acquired through fixed-focal-length optical systems whose focal lengths are mutually different, but does not disclose a configuration to provide increased field angles of imaging optical systems required for expanding a zooming range. On the other hand, in the multi-lens image capturing apparatus disclosed in Japanese Patent Laid-Open No. 2005-341301, a lens surface of a wide-field-angle lens system among most object-side lens surfaces of the multiple lens systems is disposed at a position closest to the image sensor. For this reason, a further increase of a field angle of the wide-field-angle lens system causes obstruction of its field of view by a telephoto lens system.

Moreover, the image capturing apparatus disclosed in Japanese Patent Laid-Open No. 2001-330878 has a configuration in which the image sensor is moved with respect to the multiple fixed-focal-length lenses to switch the fixed-focal-length lens to be used for the image capturing. This configuration makes it impossible to use the image capturing apparatus as a multi-lens image capturing apparatus that simultaneously acquires multiple images whose field angles are mutually different.

SUMMARY OF THE INVENTION

The present invention provides a multi-lens optical apparatus capable of providing a wider field angle and a sufficient field of view to a wide-angle-side imaging optical system of multiple imaging optical systems whose focal lengths are mutually different.

The present invention provides as an aspect thereof a multi-lens optical apparatus including multiple imaging optical systems configured to respectively form optical images of an object in mutually different areas on an image plane. The multiple imaging optical systems include imaging optical systems having mutually different focal lengths, and adjacent lenses included in the multiple imaging optical systems are integrally held, the adjacent lenses being mutually adjacent in a direction orthogonal to optical axes of the multiple imaging optical systems. Of the multiple imaging optical systems, a most wide-angle imaging optical system whose focal length is shortest includes a most object-side lens that is a meniscus lens having a negative optical power and having a convex surface toward an object side, and the convex surface is disposed at a most object-side position in the multiple imaging optical systems.

Further features of the present invention will become apparent from the following description of exemplary embodiments (with reference to the attached drawings).

DESCRIPTION OF THE EMBODIMENTS

Figure 1:
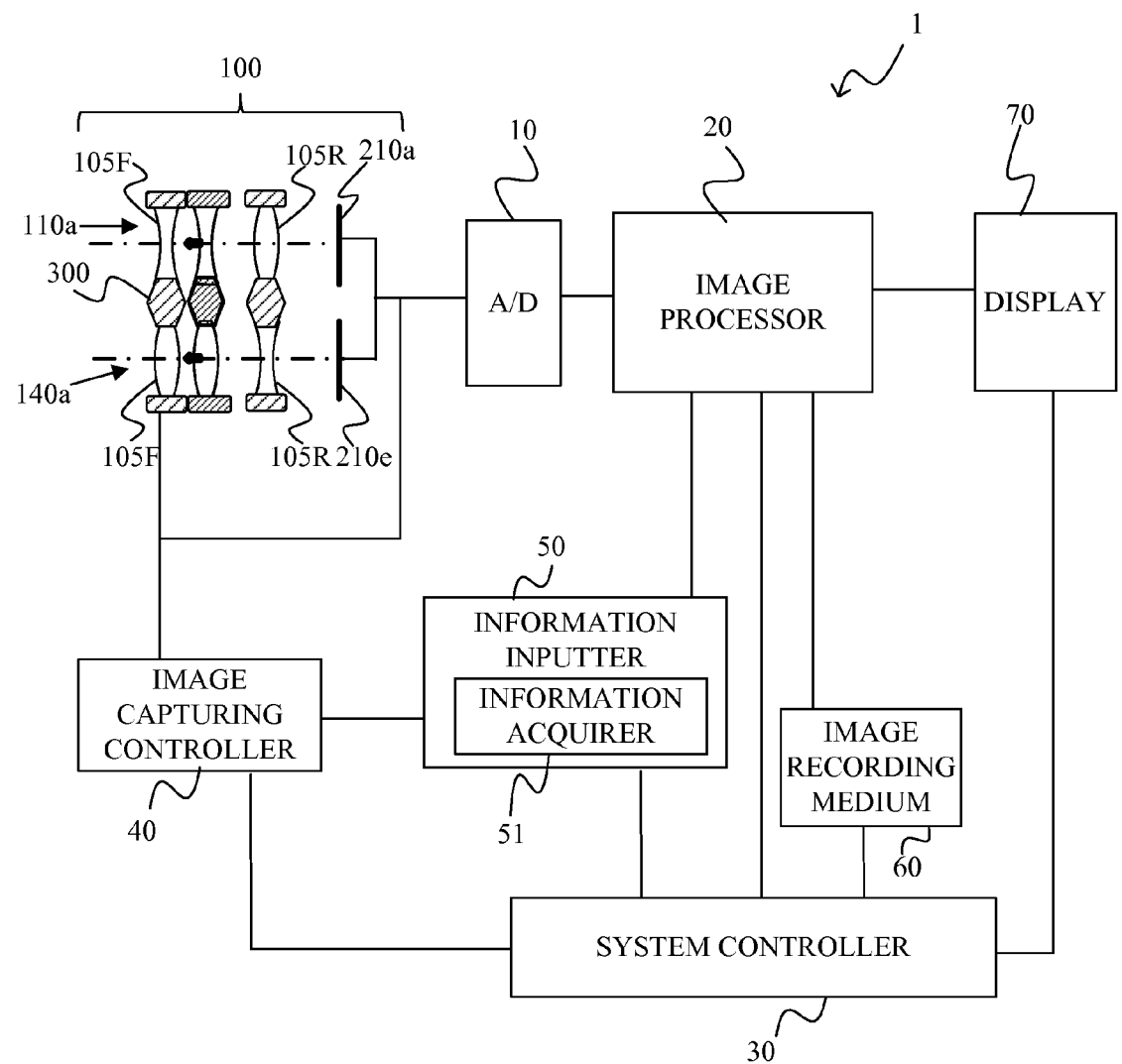
FIG. 1 is a block diagram illustrating a configuration of a multi-lens image capturing apparatus that is an embodiment of the present invention.

Exemplary embodiments of the present invention will be described below with reference to the attached drawings.

First, description will be made of a configuration of a multi-lens image capturing apparatus (hereinafter simply referred to as "an image capturing apparatus") as a multi-lens optical apparatus that is an embodiment of the present invention, and then description will be made of specific embodiments (numerical examples) of a multi-lens imaging optical system to be used for the image capturing apparatus.

The image capturing apparatus of the embodiment includes a multi-lens imaging optical system constituted by multiple imaging optical systems having fixed focal lengths. The multiple imaging optical systems include at least two imaging optical systems whose focal lengths are mutually different. The image capturing apparatus captures (photoelectrically converts) optical images of an object formed by the multiple imaging optical systems in mutually different areas of an image plane by a single image sensor having image-capturing areas (photoelectric conversion areas) corresponding to the imaging optical systems or by multiple image sensors provided for the respective imaging optical systems. The image sensor is constituted by a photoelectric conversion element such as a CCD sensor or a CMOS sensor.

The image capturing apparatus of the embodiment provides in-focus images whose image-capturing field angles are mutually different simultaneously (that is, by a single image capturing operation) through the multiple imaging optical systems whose focal lengths are mutually different, thereby realizing zooming. In order to realize a zooming function of performing continuous zooming, the image capturing apparatus interpolates field angles between the image-capturing field angles by digital zooming that trims part of a captured image and enlarges the trimmed image to provide a virtual zooming effect. In addition, the image capturing apparatus of the embodiment inserts a telephoto image acquired through a telephoto imaging optical system and the image-capturing area or the image sensor corresponding to the telephoto imaging optical system into a partial area of an intermediate-field-angle image (digital-zoomed image) acquired by the digital zooming. This image insertion enables providing an intermediate-field-angle image whose telephoto image area has a higher resolution than that of the original digital-zoomed image area.

The multiple imaging optical systems each include a focus lens unit which is moved for focusing in a direction along an optical axis (hereinafter referred to as "an optical axis direction"). However, mutually independent designs of the multiple imaging optical systems to be used for simultaneously acquiring the multiple in-focus images whose image-capturing field angles are mutually different requires provision of driving mechanisms to drive the focus lens unites to the respective imaging optical systems due to differences of movement amounts of the focus lens units thereof. For instance, motors serving as the focus driving mechanisms are required to be provided to the respective imaging optical systems.

Moreover, even when the motor can be shared by the imaging optical systems, feed screws whose feed pitches are mutually different, gear trains whose gear ratios are mutually different and others are required to be provided to the respective imaging optical system. This results in an increase in size of the image capturing apparatus and in an increase in complexity of the driving mechanisms for the focus lens units (each hereinafter referred to as "a focus driving mechanism"). In order to make a configuration of the focus driving mechanism simple, it is necessary to equalize the movement amounts of the focus lens units for the focusing in the multiple imaging optical systems whose focal lengths are mutually different.

In the embodiment, of two imaging optical systems whose focal lengths are mutually different, one imaging optical system having a shorter focal length is referred to as "a wide-angle-side imaging optical system", and another imaging optical system having a longer focal length is referred to as "a telephoto-side imaging optical system". For these image optical systems, $f_W$ represents the focal length of the wide-angle-side imaging optical system, and $f_T$ represents the focal length of the telephoto-side imaging optical system. Moreover, for the wide-angle-side imaging optical system, $\beta_{FW}$ represents a lateral magnification of the focus lens unit, and $\beta_{RW}$ represents a lateral magnification of a rear lens unit disposed on an image plane side (hereinafter referred to as "an image side") further than the focus lens unit and being a fixed lens unit that is not moved during the focusing. Furthermore, for the telephoto-side imaging optical system, $\beta_{FT}$ represents a lateral magnification of the focus lens unit, and $\beta_{RT}$ represents a lateral magnification of a rear lens unit disposed on the image side further than the focus lens unit and being a fixed lens unit that is not moved during the focusing.

With these definitions, positional sensitivities $ES_W$ and $ES_T$ of the focus lens units of the wide-angle-side and telephoto-side imaging optical systems are respectively expressed by the following expressions (1) and (2):

$$ES_W = (1-\beta_{FW}^2)\cdot\beta_{RW}^2 \quad (1)$$

$$ES_T = (1-\beta_{FT}^2)\cdot\beta_{RT}^2 \quad (2)$$

The positional sensitivity is a ratio of a focus variation amount to the movement amount of the focus lens unit in the optical axis direction.

A paraxial condition that should be satisfied to equalize the movement amounts of the focus lens units of the wide-angle-side and telephoto-side imaging optical systems is expressed by the following expression (3):

$$\frac{ES_W \cdot f_T^2}{ES_T \cdot f_W^2} = 1 \quad (3)$$

Expression (3) shows that it is possible to equalize the movement amounts of the focus lens units when a ratio between a square of the focal length of the wide-angle-side imaging optical system and a square of the focal length of the telephoto-side imaging optical system is equal to a ratio between position sensitivities of the focus lens units of the wide-angle-side and telephoto-side imaging optical systems. In the image capturing apparatus of the embodiment, the lateral magnifications of the focus lens units and the rear lens units are set so as to satisfy the condition expressed by expression (3).

The positional sensitivity of the focus lens unit of each imaging optical system does not need to perfectly satisfy expression (3), and it is only necessary that a focus shift be within a diameter δ of permissible circle of confusion. For instance, when a difference between an paraxial image plane shift amount Δx' and an image plane shift amount ΔA' by the focus lens unit is defined as a focus shift amount, and the diameter δ of permissible circle of confusion is approximately from 1/500 to 1/1000 of the image capturing plane (image circle), the focus shift amount |Δx'−ΔA'| only have to satisfy the following expression:

$$|\Delta x' - \Delta A'| < (F\text{-number}) \times \delta$$

For this reason, in practice, as long as a condition expressed by the following expression (4) is satisfied, the focus shift amount is within a depth of focus of each of the wide-angle-side and telephoto-side imaging optical systems. Therefore, moving the focus lens units of the wide-angle-side and telephoto-side imaging optical systems by mutually identical movement amounts enables simultaneously acquiring the in-focus images.

$$0.8 < \frac{ES_W \cdot f_T^2}{ES_T \cdot f_W^2} < 1.2 \qquad (4)$$

That is, in order achieved the simultaneous acquisition of the in-focus images whose image-capturing field angles are mutually different and the simplification of the focus driving mechanism, it is only necessary to integrally hold the focus lens units of the imaging optical systems whose focal lengths are mutually different and to equalize the movement amounts of these focus lens units so as to satisfy the condition expressed by expression (4). A higher value than the upper limit of the condition expressed by expression (4) results in, when the focus lens unit of the telephoto-side imaging optical system is moved such that the telephoto-side imaging optical system focuses on the object, an out-of-focus state of the wide-angle-side imaging optical system whose focus lens unit is moved by the equal movement amount since the focus shift amount exceeds a range of the depth of focus of the wide-angle-side imaging optical system to the object side. On the other hand, a lower value than the lower limit of the condition expressed by expression (4) results in, when the focus lens unit of the telephoto-side imaging optical system is moved such that the telephoto-side imaging optical system focuses on the object, an out-of-focus state of the wide-angle-side imaging optical system whose focus lens unit is moved by the equal movement amount since the focus shift amount exceeds a range of the depth of focus of the wide-angle-side imaging optical system to the image side.

In each embodiment, it is more desirable to use the following numerical range for expression (4):

$$0.9 < \frac{ES_W \cdot f_T^2}{ES_T \cdot f_W^2} < 1.15 \qquad (4a)$$

As described above, appropriately setting the lateral magnifications of the focus lens units and the rear lens units included in the respective imaging optical systems enables equalizing the movement amounts of the focus lens units of those imaging optical systems having the mutually different focal lengths. This setting enables simultaneously acquiring the in-focus images whose image-capturing field angles are mutually different and enables simplifying the focus driving mechanism.

Although each embodiment will describe the image capturing apparatus including the multi-lens imaging optical system and the image sensor integrated with each other, alternative embodiments of the present invention includes an interchangeable lens apparatus that includes a multi-lens imaging optical system and is configured detachably attachable to an image capturing apparatus including an image sensor.

Figure 2:
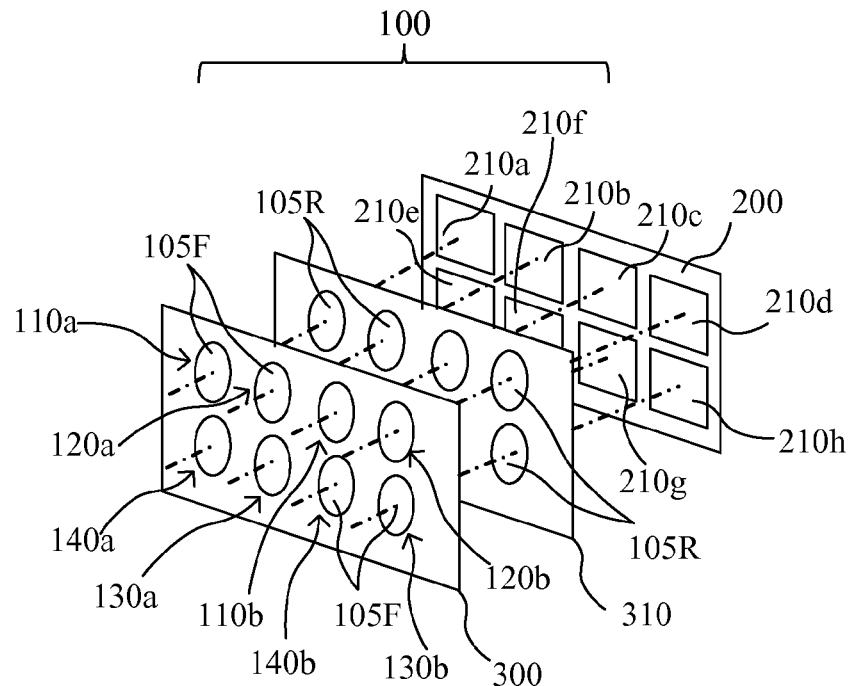
FIG. 2 is a perspective view illustrating a configuration of an image capturing unit of the multi-lens image capturing apparatus of the embodiment.
Figure 3:
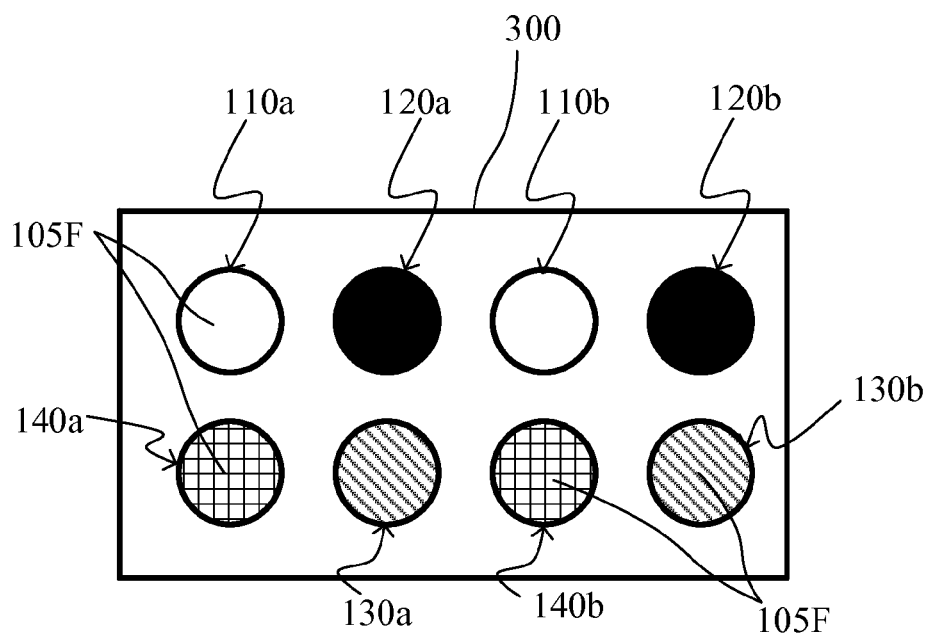
FIG. 3 is a front view of the image capturing unit.

A basic configuration of the image capturing apparatus of the embodiment will be described below. FIG. 1 illustrates the configuration of the image capturing apparatus 1 of the embodiment. FIGS. 2 and 3 illustrate a configuration of an image capturing unit 100 of the image capturing apparatus 1.

The image capturing apparatus 1 includes the image capturing unit 100, an A/D converter 10, an image processor 20, a system controller 30, an image capturing controller 40, an information inputter 50, an image recording medium 60 and display 70.

The image capturing unit 100 includes eight imaging optical systems (fixed-focal-length imaging optical systems) 110a, 110b, 120a, 120b, 130a, 130b, 140a and 140b respectively forming optical images of an object. The image capturing unit 100 further includes eight image sensors 210a to 210h respectively corresponding to the eight imaging optical systems. FIG. 1 illustrates a section including optical axes (indicated by dashed-dotted lines in the drawing) of the imaging optical systems 110a and 140a in the image capturing unit 100. As illustrated in FIG. 2, the imaging optical systems 110a, 120a, 130a, 140a, 110b, 120b, 130b and 140b are arranged such that their optical axes are parallel to one another.

Each imaging optical system includes a focus lens unit 105F movable in its optical axis direction for focusing and a rear lens unit (fixed-lens group) 105R that is not moved during the focusing. The focus lens units 105F of the eight imaging optical systems are integrally held by a holder and integrally driven 300 so as to be moved by mutually equal movement amounts with respect to a positional change of the object to be focused. On the other hand, the rear lens units 105R of the eight imaging optical systems are integrally held by a holder 310 and are fixed during the focusing. Each imaging optical system includes other optical members such as an aperture stop (not illustrated).

A method of integrally moving part of each imaging optical system for focusing as described above is known as partial focusing. Each focus lens unit 105F is constituted by a single lens or multiple lenses. Integrally holding the focus lens units of the eight imaging optical systems enables simplifying an adjustment process such as positioning of each imaging optical system in incorporating the eight imaging optical systems into the image capturing apparatus.

The eight image sensors 210a to 120h are integrally held and thereby constitute an image sensor unit 200. The image sensor 210a corresponds to the imaging optical system 110a, and the image sensor 210b corresponds to the imaging optical system 120a. The image sensor 210c corresponds to the imaging optical system 110b, and the image sensor 210d corresponds to the imaging optical system 120b. The image sensor 210e corresponds to the imaging optical system 140a, and the image sensor 210f corresponds to the imaging optical system 130a. The image sensor 210g corresponds to the imaging optical system 140b, and the image sensor 210h corresponds to the imaging optical system 130b.

Of the eight imaging optical systems 110a, 120a, 130a, 140a, 110b, 120b, 130b and 140b, two imaging optical systems denoted by a reference numeral followed by a letter "a" or "b" (e.g., 110a and 110b) have mutually identical focal lengths. On the other hand, four grouped imaging optical systems 110(a,b), 120(a,b), 130(a,b) and 140(a,b) denoted by mutually different reference numerals have mutually different focal lengths. Of the four grouped imaging optical systems, the imaging optical system 110(a,b) is a wide-angle optical system having a shortest focal length, and the imaging optical systems 120(a,b) is a wide-middle-angle optical system having a second shortest focal length. The imaging optical system 130(a,b) is a telephoto-middle-angle optical system having a second longest (third shortest) focal length, and the imaging optical system 140(a,b) is a telephoto optical system having a longest focal length.

Of the eight imaging optical systems, four are arranged in a horizontal direction on an upper side and the other four are arranged in the horizontal direction on a lower side. Each imaging optical system disposed on the upper side and one imaging optical system disposed on the lower side thereof form a pair. Specifically, in a front view (that is, when viewed from the optical axis direction) illustrated in FIG. 3, in order from left, the wide-angle optical system 110a and the telephoto optical system 140a form a pair, and the wide-middle-angle optical system 120a and the telephoto-middle-angle optical system 130a form a pair. Furthermore, the wide-angle optical system 110b and the telephoto optical system 140b form a pair, and the wide-middle optical system 120b and the telephoto-middle-angle optical system 130b form a pair. As just described above, the multiple (eight) imaging optical systems include multiple pairs (four pairs) of the imaging optical systems such that each two imaging optical systems having mutually different focal lengths forms one pair. In the embodiment, of the multiple pairs (four pairs) of the imaging optical systems, at least one pair of the imaging optical systems (for example, 110a and 140a) has a combination of focal lengths different from that of at least other one pair of the imaging optical systems (for example, 120a and 130a).

In the following description, adjacent lenses respectively constituting the focus lens units of one and the other of the paired imaging optical systems and being adjacent to each other in a direction (up-and-down direction) orthogonal to their optical axes are referred to as "paired lenses". The holder 300 integrally holds four paired focus lenses respectively constituting the focus lens units of the four paired imaging optical systems. On the other hand, adjacent lenses respectively constituting the rear lens units of one and the other of the paired imaging optical systems and being adjacent to each other in the up-and-down direction orthogonal to their optical axes are also referred to as "paired lenses". The holder 310 integrally holds four paired lenses respectively constituting the rear lens units of the four paired imaging optical systems.

In FIGS. 1 and 2, the optical images respectively formed by the paired imaging optical systems 110a and 140a are photoelectrically converted by the image sensors 210a and 210e into analog electrical signals. In a same manner, the optical images respectively formed by the paired imaging optical system 120a and 130a are photoelectrically converted by the image sensors 210b and 210f into analog electrical signals. Moreover, the optical images respectively formed by the paired imaging optical systems 110b and 140b are photoelectrically converted by the image sensor 210c and 210g into analog electrical signals. Furthermore, the optical images respectively formed by the paired imaging optical systems 120b and 130b are photoelectrically converted by the image sensors 210d and 210h into analog electrical signals The A/D converter 10 illustrated in FIG. 1 converts the analog electrical signals output from the image sensors 210a to 210h into digital signals and supplies the digital signals to the image processor 20. The image processor 20 performs predetermined image processes such as a pixel interpolation process and a color conversion process on the digital signals from the A/D converter 10 to produce captured images as digital images. In addition, the image processor 20 performs a predetermined calculation process by using data of the captured images. Data showing a result of the calculation process performed by the image processor 20 is sent to the system controller 30.

The information inputter 50 acquires, at its information acquisition unit 51, information on an image capturing condition input by a user and supplies the information to the system controller 30. The system controller 30 controls the image capturing controller 40 on a basis of the supplied various data. The image capturing controller 40 controls a position (movement amount) of the focus lens units 105F, an aperture value of each imaging optical system, an exposure time of each of the image sensors 210a to 210h and others to perform image capturing.

Figure 4:
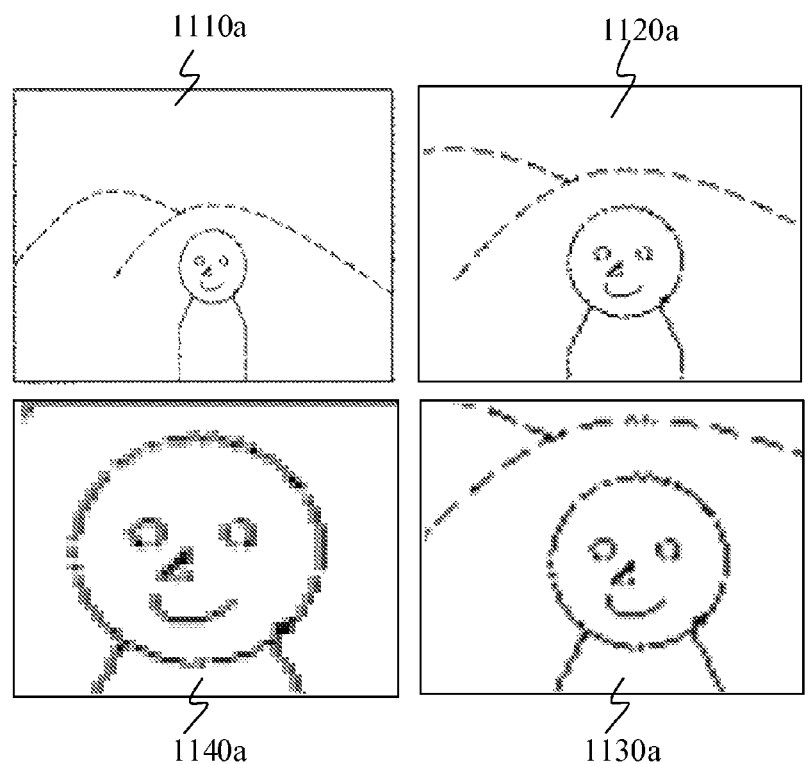
FIG. 4 illustrates a captured image produced by the multi-lens image capturing apparatus of the embodiment.

FIG. 4 illustrates captured images 1110a, 1120a, 1130a and 1140a acquired through the imaging optical systems 110a, 120a, 130a and 140a. As illustrated in FIG. 4, the captured image 1110a acquired through the wide-angle optical system 110a corresponding to a widest image-capturing field angle (object space). The captured image 1120a, 1130a and 1140a respectively acquired through the wide-middle-angle optical system 120a, the telephoto-middle-angle optical system 130a and the telephoto optical system 140a correspond to a narrower image-capturing field angle in this order.

Figure 5:
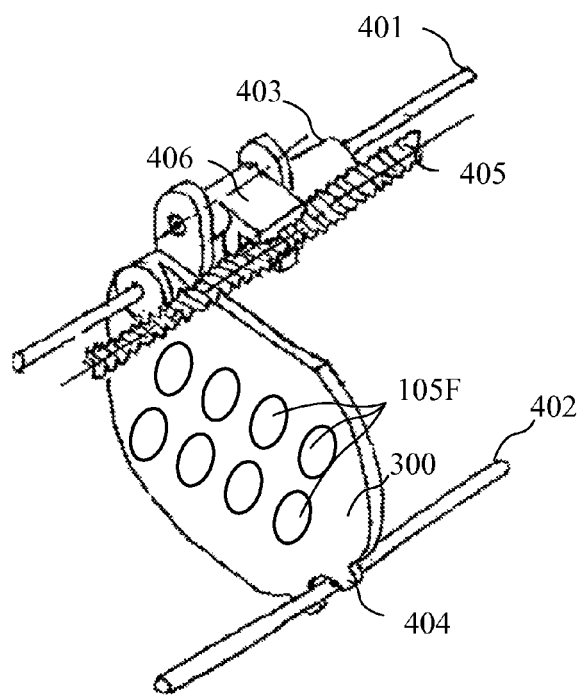
FIG. 5 is a perspective view illustrating a configuration of a focus lens unit driving mechanism in the multi-lens image capturing apparatus of the embodiment.

FIG. 5 illustrates a configuration of the focus driving mechanism of the image capturing unit 100. The holder 300 holding the focus lens units 105F of the eight imaging optical systems includes a sleeve portion 403 and a U-shaped groove portion 404 respectively engaging with a first guiding bar 401 and a second guiding bar 402 each extending in the optical axes of the imaging optical systems. The sleeve portion 403 is guided by the first guiding bar 401 in the optical axis direction. The U-shaped groove portion 404 prevents the holder 300 from rotating about the first guiding bar 401.

In addition, the focus driving mechanism includes a lead screw 405 that is rotated by an actuator such as a stepping motor (not illustrated) and a rack 406 engaging with the lead screw 405. The rack 406 is fixed to the holder 300. Rotation of the lead screw 405 is converted by the rack 406 into a driving force toward the optical axis direction, and the holder 300 is moved by the driving force together with the focus lens units 105F in the optical axis direction.

Each paired imaging optical systems whose focal lengths are mutually different satisfies the condition expressed by expression (4). This applies also to any paired imaging optical systems whose focal lengths are mutually different. For this reason, moving the holder 300 integrally holding the focus lens units 105F of the four paired imaging optical systems (that is, moving the focus lens units 105F by mutually equal movement amounts) enables the four paired imaging optical systems to focus on an object located at equal distances therefrom. Thus, it is possible to acquire, by one-time image capturing control, four pairs of in-focus images whose image-capturing field angles are mutually different (in other words, four pairs of in-focus images whose image-capturing field angles are mutually identical).

As described above, integrally holding the four paired lenses included in the four paired imaging optical systems by the holder 300 or the holder 310 enables simplifying adjustments such as positioning of each imaging optical system in assembly of the eight imaging optical systems. Specifically, putting a positioning mark on the holder beforehand and then assembling the imaging optical systems such that the mark coincides with a predetermined position enables performing the positioning of the four paired lenses held by the holder at one time (that is, by a single process).

The image recording medium 60 stores the data of the captured image and some information such as the information on the image capturing condition corresponding to when the captured image is acquired. The display 70 is constituted by a display device such as a liquid crystal display and displays the captured image and other information.

Although FIGS. 1 and 2 illustrate the case of constituting each imaging optical system by two lens units that are the focus lens unit F and the rear lens unit R, each imaging optical system may have three or more lens units.

Moreover, in the embodiment, of the wide-angle optical system whose focal length is the shortest, a most object-side lens is a meniscus lens that has a negative optical power (optical power is an inverse of the focal length) and whose convex surface faces toward the object side. Using such a meniscus lens enables effectively correcting distortion and field curvature both generated when the wide-angle optical system has a wider field angle. Furthermore, an object-side convex surface of the meniscus lens is disposed at a most object-side position in the multiple imaging optical systems. Disposing the object-side convex surface at the most object-side position eliminates light flux vignetting by the other imaging optical systems even when the wide-angle optical system has a wider field angle, which prevents obstruction thereby of a field of view of the wide-angle optical system. This configuration makes it possible to acquire, by one-time image capturing, multiple in-focus images whose image-capturing field angles, including a wide image-capturing field angle corresponding to the wide-angle optical system, are mutually different.

Furthermore, in the embodiment, it is desirable that the above-described paired lenses have mutually different surface shapes. Moreover, it is desirable that paired lenses of at least one paired imaging optical systems of the multiple paired imaging optical systems be formed by mutually identical materials. As long as the paired lenses included in the paired imaging optical systems having the mutually different focal lengths have such mutually different surface shapes, it is possible for the paired imaging optical systems to provide a sufficient image-capturing performance even when the paired lenses are integrally held. Moreover, forming the paired lenses of at least one paired imaging optical systems by such mutually identical materials enables reducing a manufacturing cost thereof even when multiple imaging optical systems are provided to the image capturing apparatus, which makes it possible to reduce a cost required for the entire image capturing apparatus.

In this case, forming (integrally forming) the paired lenses as an integrated member by the identical material enables further reducing the manufacturing cost and further simplifying the assembly of the paired imaging optical systems.

Figure 10:
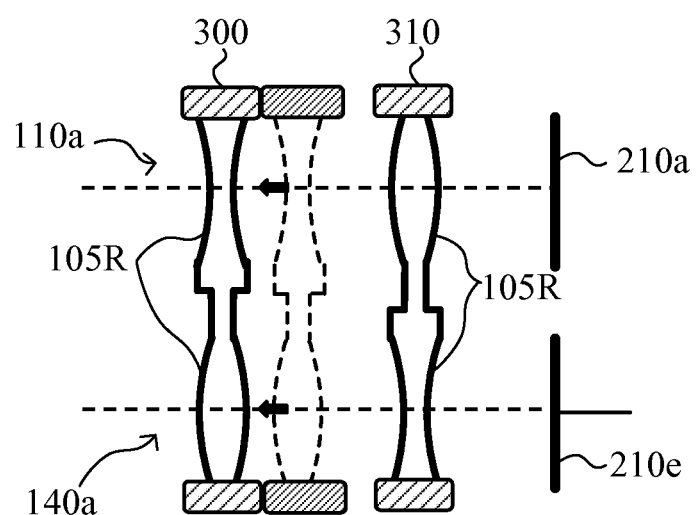
FIG. 10 is a sectional view illustrating a modified example of the multi-lens image capturing apparatus of the embodiment.

FIG. 10 illustrates, as an example, a section of the paired imaging optical systems illustrated in FIG. 1 in which the integrally-formed paired lenses constituting the focus lens units 105F and the integrally-formed paired lenses constituting the rear lens units 105R. The holder 300 holds the integrally-formed paired lenses constituting the focus lens units 105F, and the holder 310 holds the integrally-formed paired lenses constituting the rear lens units 105R. As a method of integrally forming the paired lenses, a conventional injection molding method or a glass molding method that presses a glass filled in a mold can be used.

As described above, integrally molding the paired lenses included in the paired imaging optical systems having the mutually different focal lengths by the identical material enables reducing number of processes required for manufacturing and assembly of the paired imaging optical systems, which enables cost reduction.

In addition, it is desirable that the paired lenses of at least one paired imaging optical systems among the at least one paired imaging optical systems whose paired lenses are formed by the mutually identical materials have refractive powers of mutually identical signs. This configuration enables effectively correcting chromatic aberration generated in the paired imaging optical systems including the paired lenses having the refractive powers of the mutually identical signs.

Furthermore, it is desirable to constitute each imaging optical system by at least three lenses. Moreover, it is desirable to provide a meniscus shape to at least one of the paired lenses of, among the multiple paired imaging optical systems, at least one paired imaging optical systems in which surface centers of the paired lenses are located at mutually different positions in the optical axis. Constituting each imaging optical system by three or more lenses enables effectively correcting aberrations generated in the imaging optical system. Additionally, this further enables constituting each focus lens unit by two or more lenses when the partial focusing is performed, which enables effectively correcting variations in field curvature and chromatic aberration generated due to focusing. Furthermore, providing the meniscus shape to the at least one of the paired lenses whose surface centers are located at mutually different position in the optical axis direction enables making connected portions of the paired lenses closer to each other. This enables integrally holding or integrally forming the paired lenses more easily.

The configuration of the image capturing apparatus of this embodiment enables simplifying assembly of (that is, reducing the number of assembling processes for) the multiple imaging optical systems whose focal lengths are mutually different and each of which is constituted by multiple lenses, and it further enables the wide-angle-side imaging optical system to have a wider field angle and a sufficient field of view.

Description will hereinafter be made of specific embodiments of the multi-lens imaging optical system and numerical examples corresponding to the embodiments.

[Embodiment 1]

Figure 6A:
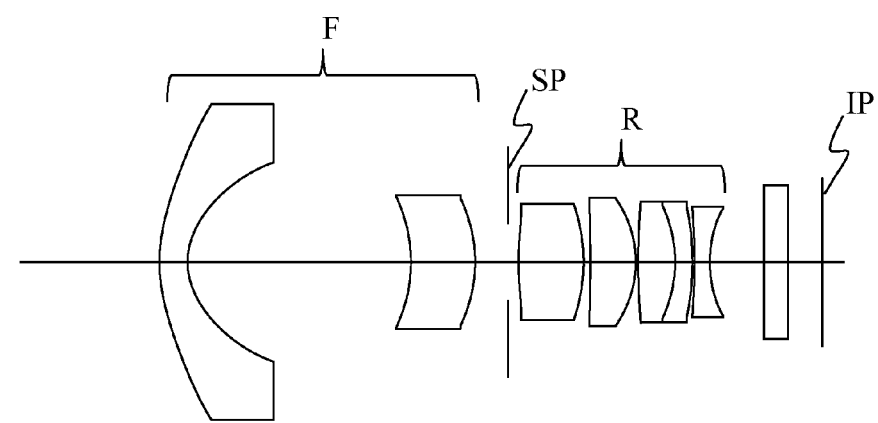
FIGS. 6A and 6B are sectional views of a wide-angle optical system and a telephoto optical system that constitute a multi-lens imaging optical system of a multi-lens image capturing apparatus of Embodiment 1 (Numerical Example 1).
Figure 6B:
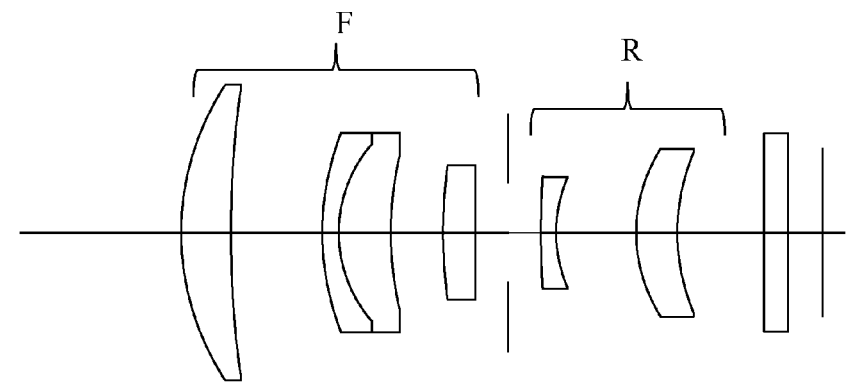

FIGS. 6A and 6B illustrate sections of a wide-angle optical system and a telephoto optical system constituting part of a multi-lens imaging optical system of a first embodiment (Embodiment 1). In these sectional views, a left side corresponds to an object side (front side), and a right side corresponds to an image side (rear side; hereinafter referred to also as "an image side"). Reference symbol F represents a focus lens unit, and reference symbol R represents a rear lens unit. Reference symbol SP represents an aperture stop, and reference symbol IP represents an image plane. On the image plane IP, a single image sensor having image-capturing areas for the respective optical systems is disposed or multiple image sensors provided for the respective optical systems are disposed. The description of these reference symbols applies also to another embodiment described later.

Figure 7A:
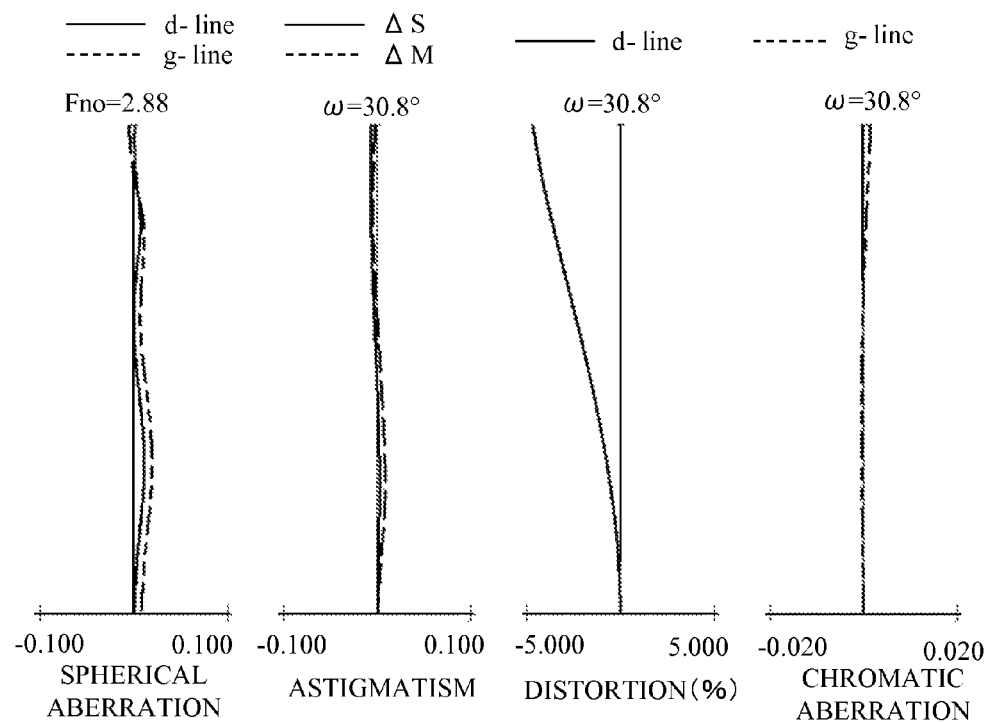
FIGS. 7A and 7B are aberration diagrams of the wide-angle optical system and the telephoto optical system in Numerical Example 1.
Figure 7B:
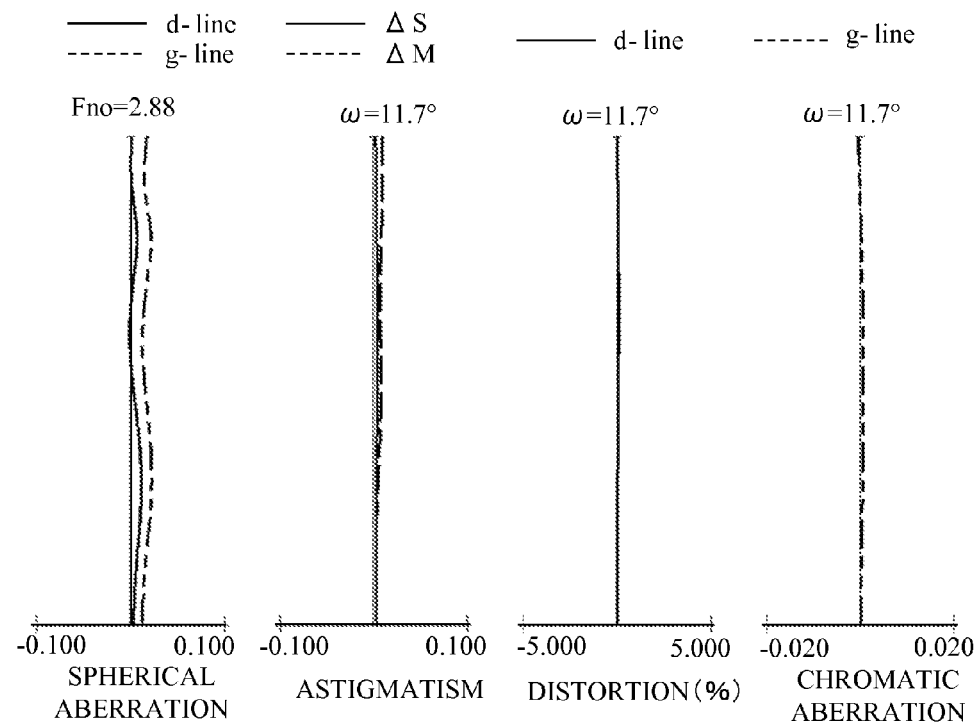

FIGS. 7A and 7B illustrate aberrations generated in the wide-angle optical system and the telephoto optical system of Numerical Example 1 (described later) corresponding to Embodiment 1. In a spherical aberration diagram in FIGS. 7A and 7B, symbols "d-line" and "g-line" respectively indicate a spherical aberration for a d-line and a spherical aberration for a g-line. In an astigmatism diagram, symbols "ΔM" and "ΔS" respectively indicate an astigmatism in a meridional image plane and an astigmatism in a saggittal image plane. In a distortion diagram, a distortion for the d-line is shown. In a chromatic aberration diagram, chromatic aberration of magnification for the g-line is shown. Symbol ω represents a field angle, and symbol Fno represents an F-number. The description of these symbols and aberration diagrams applies also to the other embodiment described alter.

Each of the imaging optical systems constituting the multi-lens imaging optical system of this embodiment is a front-lens focusing type optical system. When focusing is performed from an infinite object side to a close-distance object side, the focus lens unit F in each imaging optical system is moved to the object side and the rear lens unit R is not moved.

The focus lens unit F of the wide-angle optical system illustrated in FIG. 6A is constituted by a meniscus lens that has a negative optical power and whose convex surface faces toward the object side and a meniscus-shaped positive lens whose concave surface faces toward the object side. This configuration enables miniaturizing the wide-angle optical system and effectively correcting distortion and chromatic aberration. In addition, the object-side convex surface of the negative meniscus lens is, in the optical axis direction, located at a most object-side position among most object-side surfaces (first surfaces) of the imaging optical systems. Disposing the object-side convex surface of the most object-side negative meniscus lens of the wide-angle optical system at the most object-side position of the multiple (four paired) imaging optical systems prevents a field of view of the wide-angle optical system from being obstructed by the other imaging optical systems. Furthermore, employing the above-described disposition enables disposing an outer circumferential portion (edge portion) of the negative meniscus lens closer to an edge portion of most object-side lenses of the other imaging optical systems. This enables integrally holding "paired lenses" including the negative meniscus lens by a holder more easily and enables more easily connecting the paired lenses at their integrally connected portions.

In this embodiment, a length (total lens length) from the most object-side surface of the wide-angle optical system to the image plane IP is 30.6 mm. On the other hand, a total lens length of the telephoto optical system is 29.6 mm. That is, the object-side convex surface of the most object-side negative meniscus lens of the wide-angle optical system is disposed on the object side by 1 mm further than a most object-side surface of the telephoto optical system. It is more desirable that, as just described above, the object-side convex surface of the most object-side negative meniscus lens of the wide-angle optical system be disposed on the object side by 1 mm or more further than the most object-side surfaces of the other optical systems.

The rear lens unit R is constituted by a positive lens, a positive lens, a cemented positive-negative lens and a negative lens (biconcave lens) whose both side surfaces are concave surfaces.

The focus lens unit F of the telephoto optical system illustrated in FIG. 6B is constituted by a meniscus-shaped positive lens whose convex surface faces toward the object side, a cemented negative-positive lens and a positive lens. The rear lens unit R is constituted by a meniscus-shaped negative lens whose concave surface faces toward the image side, a meniscus-shaped positive lens whose concave surface faces toward the image side.

In this embodiment, the edge portion of the most object-side negative meniscus lens of the wide-angle optical system is located close to the edge portion of the most object-side positive meniscus lens of the telephoto optical system, and the edge portion of the third object-side positive lens of the wide-angle optical system is located close to the edge portion of the fourth object-side negative meniscus lens of the telephoto optical system. Therefore, these respective paired lenses can be integrally held or integrally formed.

[Embodiment 2]

Figure 8A:
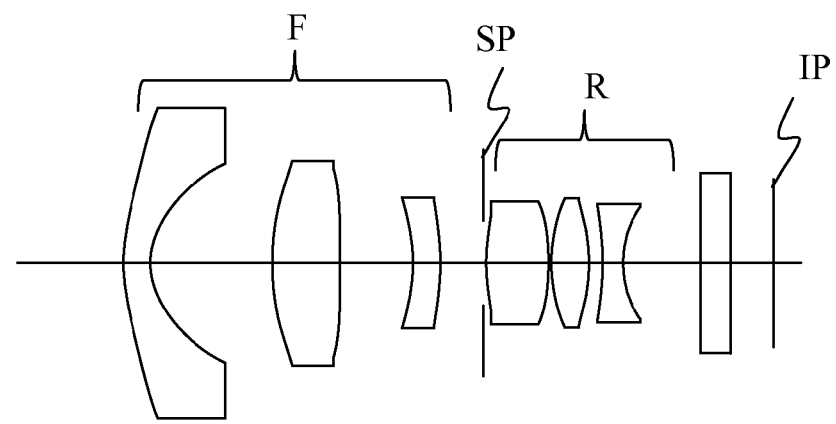
FIGS. 8A and 8B are sectional views of the wide-angle optical system and the telephoto optical system that constitute a multi-lens imaging optical system of a multi-lens image capturing apparatus of Embodiment 2 (Numerical Example 2).
Figure 8B:
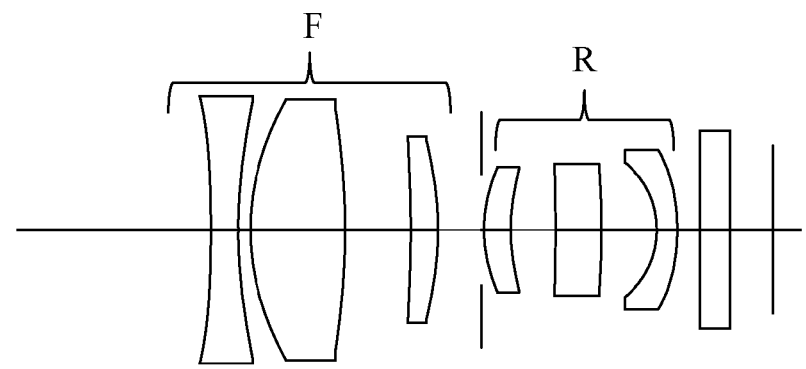
Figure 9A:
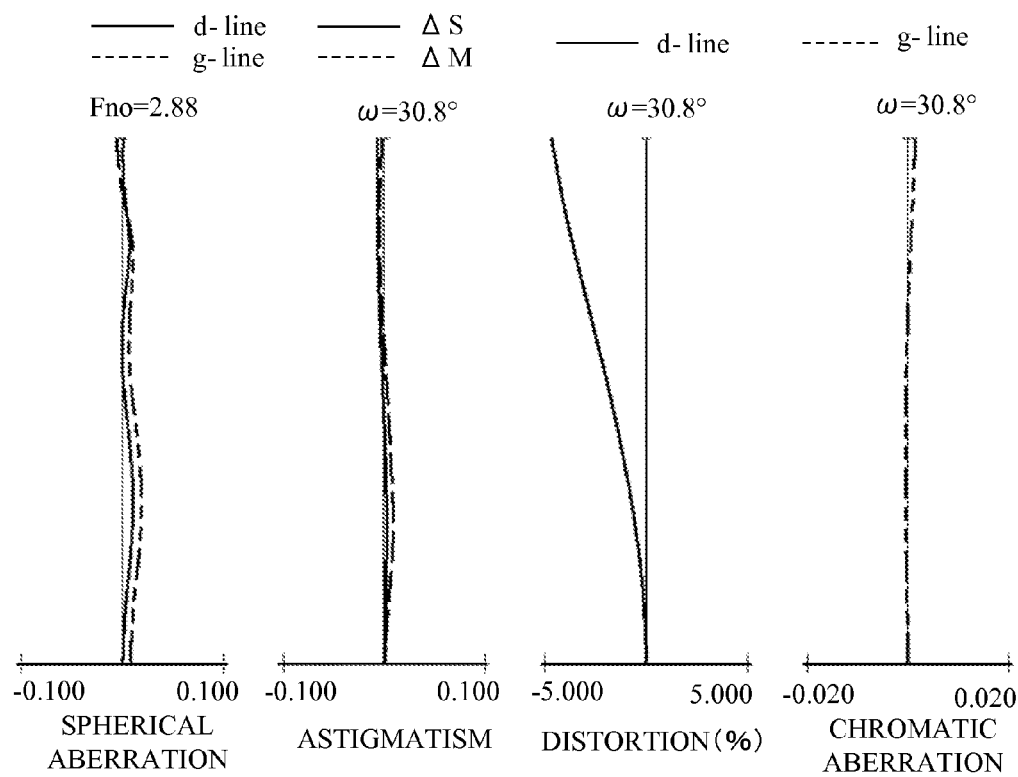
FIGS. 9A and 9B are aberration diagrams of the wide-angle optical system and the telephoto optical system in Numerical Example 2.
Figure 9B:
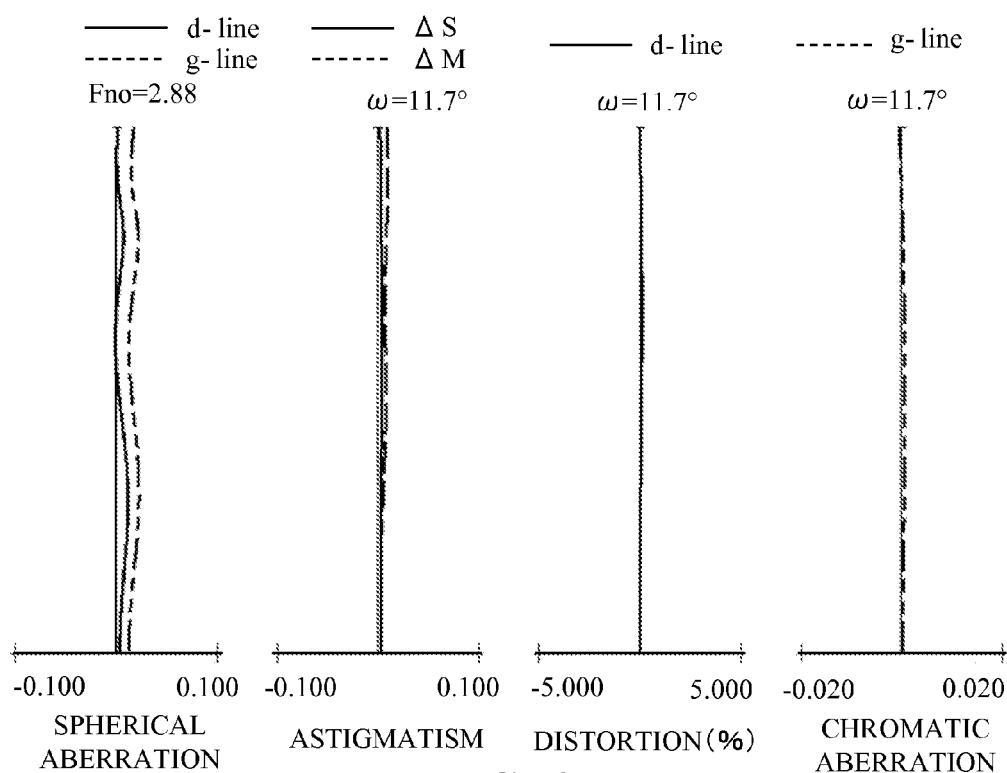

FIGS. 8A and 8B illustrate sections of a wide-angle optical system and a telephoto optical system constituting a multi-lens imaging optical system of a second embodiment (Embodiment 2). FIGS. 9A and 9B illustrate aberrations of the wide-angle optical system and the telephoto optical system of Numerical Example 2 (described later) corresponding to Embodiment 2.

Each of the imaging optical systems constituting the multi-lens imaging optical system of this embodiment is a front-lens focusing type optical system. When focusing is performed from an infinite object side to a close-distance object side, the focus lens unit F is moved to an object side, and the rear lens unit R is not moved.

The focus lens unit F of the wide-angle optical system illustrated in FIG. 8A is constituted by a meniscus lens that has a negative optical power and whose convex surface faces toward the object side, a biconvex positive lens and a meniscus-shaped negative lens whose concave surface faces toward the object side. This configuration enables miniaturizing the wide-angle optical system and effectively correcting distortion and chromatic aberration. The rear lens unit R is constituted by a positive lens, a positive lens and a biconvex negative lens.

In this embodiment, a length (total lens length) from the most object-side surface of the wide-angle optical system to the image plane IP is 24.0 mm, and a total lens length of the telephoto optical system is 20.7 mm. That is, the object-side convex surface of the most object-side negative meniscus lens of the wide-angle optical system is disposed on the object side by 3.3 mm further than a most object-side surface of the telephoto optical system.

The focus lens unit F of the telephoto optical system illustrated in FIG. 8B is constituted by a negative lens, a positive lens and a positive lens. The rear lens unit R is constituted by a meniscus-shaped positive lens whose concave surface faces toward the image side, a positive lens and a meniscus-shaped negative lens whose concave surface faces toward the object side.

In this embodiment, the second object-side positive lens of the wide-angle optical system and the second object-side positive lens of the telephoto optical system are formed by mutually identical materials, have mutually different surface shapes and refractive powers of mutually identical signs.

On the other hand, the fourth object-side positive lens of the wide-angle optical system and the fourth object-side positive lens of the telephoto optical system have surface centers located at mutually different positions in an optical axis direction. The fourth object-side positive lens of the telephoto optical system has a meniscus shape.

Also in this embodiment, edge portions of lenses (paired lenses) that respectively constitute parts of the wide-angle and telephoto imaging optical systems and whose orders from the object side are mutually identical are disposed close to each other. Therefore, the respective paired lenses can be integrally held or integrally formed.

Next, Numerical Examples 1 and 2 corresponding to the multi-lens imaging optical systems of Embodiments 1 and 2 will be shown. In each numerical example, i represents an ordinal number of an optical surface (surface number) counted from the object side. Symbol ri represents a curvature radius of an i-th optical surface (i-th surface). Symbol di represents a distance between the i-th surface and a (i+1)-th surface in the optical axis direction. Symbol ndi and vdi respectively represent a refractive index and an Abbe number of an i-th lens for the d-line. Symbol f represents a focal length, Fno an F-number, and ω a half field angle. A distance di of 0 means that a front-side surface and a rear-side surface forming the distance di are cemented to each other. The focal length f, the F-number Fno and the half field angle ω each indicate a value corresponding to when the imaging optical system is focused on an infinite object. Symbol BF represents an air-equivalent value of a distance (back focus) from a final lens surface to the image plane.

In addition, an aspheric shape of a lens surface (each surface number follows "*") is expressed by the following expression using aspheric coefficients K, A3, A4, A5, A6, A7, A8, A9, A10, A11 and A12 where R represents a curvature radius of a central portion of the lens surface, and H represents a position on the lens surface in a direction orthogonal to the optical axis direction:

$$X = (H^2/R)/[1 + \{1 - (1+K)(H/R)2\}^{1/2}] +$$
$$A3 \cdot H^3 + A4 \cdot H^4 + A5 \cdot H^5 + A6 \cdot H^6 + A7 \cdot H^7 +$$
$$A8 \cdot H^8 + A9 \cdot H^9 + A10 \cdot H^{10} + A11 \cdot H^{11} + A12 \cdot H^{12}$$

In each aspherical coefficient, "e±XX" means "×10±XX".

Furthermore, values for the condition expressed by the above-described expression (4) in Numerical examples 1 and 2 are collectively shown in Table 1.

NUMERICAL EXAMPLE 1

WIDE-ANGLE OPTICAL SYSTEM
UNIT: mm
SURFACE DATA

| SURFACE NUMBER | r | d | nd | vd | EFFECTIVE DIAMETER |
|---|---|---|---|---|---|
| 1* | 7.404 | 1.30 | 1.55332 | 71.7 | 14.08 |
| 2* | 3.200 | 10.31 | | | 9.19 |
| 3 | −7.045 | 2.96 | 1.48749 | 70.2 | 5.70 |
| 4 | −6.679 | 1.50 | | | 5.48 |
| 5(STOP) | ∞ | 0.50 | | | 3.58 |
| 6* | 13.012 | 3.00 | 1.55332 | 71.7 | 3.92 |
| 7 | −8.146 | 0.31 | | | 4.98 |
| 8 | −83.682 | 2.10 | 1.49700 | 81.5 | 5.18 |
| 9 | −5.101 | 0.10 | | | 5.48 |
| 10 | 31.259 | 1.71 | 1.49700 | 81.5 | 5.17 |
| 11 | −6.100 | 0.80 | 1.84666 | 23.8 | 4.89 |
| 12 | −12.542 | 0.10 | | | 4.84 |
| 13 | −27.930 | 0.70 | 1.85400 | 40.4 | 4.74 |
| 14* | 6.238 | 2.50 | | | 4.56 |
| 15 | ∞ | 1.10 | 1.51633 | 64.1 | 6.04 |
| 16 | ∞ | | | | 6.57 |
| IMAGE PLANE | ∞ | | | | |

ASPHERIC SURFACE DATA

1ST SURFACE

K = −5.79997e−001   A 4 = −1.15761e−003   A 6 = 1.54266e−005
A 8 = −8.19803e−008   A10 = −1.10277e−010

2ND SURFACE

K = −6.05643e−001   A 4 = −1.33299e−003   A 6 = −4.73214e−006
A 8 = −7.39960e−007   A10 = 3.09526e−008

6TH SURFACE

K = −5.78386e+001   A 4 = 9.45634e−004   A 6 = −5.68033e−004
A 8 = 6.51556e−005   A10 = −5.52108e−006

14TH SURFACE

K = −4.35595e−001   A 4 = 2.17226e−003   A 6 = 1.20849e−004
A 8 = −4.57029e−006   A10 = 5.79376e−007

VARIOUS DATA

| | |
|---|---|
| FOCAL LENGTH | 4.40 |
| F-NUMBER | 2.88 |
| HALF FIELD ANGLE | 41.37 |
| IMAGE HEIGHT | 3.88 |
| TOTAL LENS LENGTH | 30.60 |
| BF | 1.60 |
| ENTRANCE PUPIL POSITION | 7.64 |
| EXIT PUPIL POSITION | −7.45 |
| FRONT-SIDE PRINCIPAL POINT POSITION | 9.90 |
| REAR-SIDE PRINCIPAL POINT POSITION | −2.80 |

SINGLE LENS DATA

| LENS | INITIAL SURFACE | FOCAL LENGTH |
|---|---|---|
| 1 | 1 | −11.45 |
| 2 | 3 | 72.17 |
| 3 | 6 | 9.54 |
| 4 | 8 | 10.83 |
| 5 | 10 | 10.43 |
| 6 | 11 | −14.88 |
| 7 | 13 | −5.91 |
| 8 | 15 | 0.00 |

TELEPHOTO OPTICAL SYSTEM
UNIT: mm
SURFACE DATA

| SURFACE NUMBER | r | d | nd | vd | EFFECTIVE DIAMETER |
|---|---|---|---|---|---|
| 1* | 12.459 | 2.30 | 1.55332 | 71.7 | 12.65 |
| 2* | 55.949 | 4.21 | | | 12.09 |
| 3 | 12.550 | 0.76 | 1.72047 | 34.7 | 8.55 |
| 4 | 6.251 | 2.40 | 1.49700 | 81.5 | 7.57 |
| 5 | 15.618 | 2.41 | | | 6.61 |
| 6 | 22.631 | 1.50 | 1.67790 | 55.3 | 5.73 |
| 7 | −1218.490 | 1.50 | | | 5.35 |
| 8(STOP) | ∞ | 1.51 | | | 4.61 |
| 9* | 43.453 | 0.70 | 1.58313 | 59.4 | 4.76 |
| 10 | 6.355 | 3.69 | | | 4.77 |
| 11* | 7.011 | 1.90 | 1.85135 | 40.1 | 7.18 |
| 12 | 9.435 | 4.01 | | | 6.87 |
| 13 | ∞ | 1.10 | 1.51633 | 64.1 | 8.33 |
| 14 | ∞ | | | | 8.46 |
| IMAGE PLANE | ∞ | | | | |

ASPHERIC SURFACE DATA

1ST SURFACE

K = 6.31393e−001    A 4 = −4.37315e−005    A 6 = −1.22774e−007
A 8 = −9.35480e−009  A10 = 3.52194e−011
2ND SURFACE

K = −3.41126e+001   A 4 = 5.89862e−005     A 6 = 6.47254e−008
A 8 = −7.02093e−009  A10 = 1.02481e−010
9TH SURFACE

K = 8.83136e+001    A 4 = 1.38291e−004     A 6 = −2.27663e−005
A 8 = 2.98008e−006   A10 = −1.66891e−007
11TH SURFACE

K = 0.00000e+000    A 4 = −1.58771e−004    A 6 = −1.89942e−006
A 8 = 1.81385e−007   A10 = −7.14087e−009

VARIOUS DATA

| | |
|---|---|
| FOCAL LENGTH | 27.80 |
| F-NUMBER | 2.88 |
| HALF FIELD ANGLE | 7.94 |
| IMAGE HEIGHT | 3.88 |
| TOTAL LENS LENGTH | 29.60 |
| BF | 1.60 |
| ENTRANCE PUPIL POSITION | 26.19 |
| EXIT PUPIL POSITION | −11.37 |
| FRONT-SIDE PRINCIPAL POINT POSITION | −5.62 |
| REAR-SIDE PRINCIPAL POINT POSITION | −26.20 |

SINGLE LENS DATA

| LENS | INITIAL SURFACE | FOCAL LENGTH |
|---|---|---|
| 1 | 1 | 28.43 |
| 2 | 3 | −18.21 |
| 3 | 4 | 19.33 |
| 4 | 6 | 32.79 |
| 5 | 9 | −12.86 |
| 6 | 11 | 23.57 |
| 7 | 13 | 0.00 |

NUMERICAL EXAMPLE 2

WIDE-ANGLE OPTICAL SYSTEM
UNIT: mm
SURFACE DATA

| SURFACE NUMBER | r | d | nd | vd | EFFECTIVE DIAMETER |
|---|---|---|---|---|---|
| 1* | 6.429 | 1.00 | 1.53110 | 55.9 | 10.45 |
| 2* | 2.669 | 4.50 | | | 7.34 |
| 3* | 9.837 | 2.50 | 1.53110 | 55.9 | 6.99 |
| 4* | −98.190 | 2.69 | | | 6.48 |
| 5* | −6.284 | 1.00 | 1.63550 | 23.9 | 4.45 |
| 6* | −9.218 | 1.60 | | | 4.20 |
| 7(STOP) | ∞ | 0.10 | | | 3.14 |
| 8* | 7.243 | 2.30 | 1.53110 | 55.9 | 3.38 |
| 9* | −10.895 | 0.10 | | | 4.21 |
| 10* | 5.553 | 1.40 | 1.53110 | 55.9 | 4.43 |
| 11* | −6.770 | 0.50 | | | 4.34 |
| 12* | −9.637 | 0.75 | 1.63550 | 23.9 | 4.05 |
| 13* | 4.578 | 2.86 | | | 3.85 |
| 14 | ∞ | 1.10 | 1.51633 | 64.1 | 5.63 |
| 15 | ∞ | | | | 6.17 |
| IMAGE PLANE | ∞ | | | | |

ASPHERIC SURFACE DATA

1ST SURFACE

K = −7.52241e+000   A 4 = −7.77610e−004    A 6 = 9.19501e−006
A 8 = 1.03786e−006   A10 = −3.49887e−008    A12 = 3.60174e−010
2ND SURFACE

K = −5.90705e−001   A 4 = −4.81245e−003    A 6 = 2.77982e−004
A 8 = −2.95230e−005  A10 = 1.68607e−006     A12 = −4.23676e−008
3RD SURFACE

K = −2.62163e+001   A 4 = 3.89577e−003     A 6 = −3.51883e−004
A 8 = 2.72508e−005   A10 = −1.45133e−006    A12 = 2.74768e−008
4TH SURFACE

K = 8.99414e+001    A 4 = −2.80469e−004    A 6 = −7.35250e−005
A 8 = 5.96298e−006   A10 = −1.01667e−006    A12 = 4.24368e−008
5TH SURFACE

K = −1.81335e+001   A 4 = −6.13463e−003    A 6 = 1.42258e−003
A 8 = −2.17486e−004  A10 = 1.27021e−005     A12 = 2.80472e−007
6TH SURFACE

K = −4.98314e+001   A 4 = −5.26715e−003    A 6 = 1.62525e−003
A 8 = −2.95696e−004  A10 = 2.42489e−005     A12 = −1.60854e−007
8TH SURFACE

K = −1.68951e+001   A 4 = 2.06255e−003     A 6 = −2.09781e−004
A 8 = −6.18359e−004  A10 = 2.24328e−004     A12 = −2.92503e−005
9TH SURFACE

K = −8.03453e+001   A 4 = −1.34786e−002    A 6 = 3.81624e−003
A 8 = −1.47982e−003  A10 = 3.18316e−004     A12 = −2.70026e−005
10TH SURFACE

K = −7.88338e+000   A 4 = 1.15156e−003     A 6 = 1.01968e−003
A 8 = −6.94152e−004  A10 = 1.77811e−004     A12 = −1.38902e−005
11TH SURFACE

K = −2.27187e+001   A 4 = −1.17172e−002    A 6 = 3.31804e−003
A 8 = −7.68583e−004  A10 = 1.06684e−004     A12 = −4.39744e−006
12TH SURFACE

K = −5.42897e+000   A 4 = 1.48342e−003     A 6 = 7.30671e−004
A 8 = −8.82770e−005  A10 = −7.31461e−005    A12 = 1.21843e−005
13TH SURFACE

K = −3.89170e+000   A 4 = 1.51003e−002     A 6 = −6.14715e−004
A 8 = 1.94468e−004   A10 = −9.32100e−005    A12 = 1.11024e−005

VARIOUS DATA

| | |
|---|---|
| FOCAL LENGTH | 5.20 |
| F-NUMBER | 2.88 |
| HALF FIELD ANGLE | 30.80 |
| IMAGE HEIGHT | 3.10 |
| TOTAL LENS LENGTH | 24.00 |
| BF | 1.60 |
| ENTRANCE PUPIL POSITION | 6.83 |
| EXIT PUPIL POSITION | −6.17 |
| FRONT-SIDE PRINCIPAL POINT POSITION | 8.55 |
| REAR-SIDE PRINCIPAL POINT POSITION | −3.60 |

SINGLE LENS DATA

| LENS | INITIAL SURFACE | FOCAL LENGTH |
|---|---|---|
| 1 | 1 | −9.47 |
| 2 | 3 | 16.97 |
| 3 | 5 | −35.80 |
| 4 | 8 | 8.57 |
| 5 | 10 | 5.98 |
| 6 | 12 | −4.79 |
| 7 | 14 | 0.00 |

TELEPHOTO OPTICAL SYSTEM
UNIT: mm
SURFACE DATA

| SURFACE NUMBER | r | d | nd | vd | EFFECTIVE DIAMETER |
|---|---|---|---|---|---|
| 1* | −54.306 | 1.00 | 1.63550 | 23.9 | 9.16 |
| 2* | 20.586 | 0.45 | | | 8.91 |
| 3* | 9.015 | 3.50 | 1.53110 | 55.9 | 8.92 |
| 4* | −26.808 | 2.42 | | | 8.23 |

-continued

| | | | | | |
|---|---|---|---|---|---|
| 5* | −41.695 | 1.00 | 1.53110 | 55.9 | 6.37 |
| 6* | −11.690 | 1.60 | | | 6.07 |
| 7(STOP) | ∞ | 0.10 | | | 4.11 |
| 8* | 5.540 | 1.00 | 1.53110 | 55.9 | 4.27 |
| 9* | 7.601 | 1.64 | | | 4.20 |
| 10* | −69.043 | 1.70 | 1.53110 | 55.9 | 4.33 |
| 11* | −37.921 | 2.04 | | | 4.50 |
| 12* | −3.715 | 0.75 | 1.63550 | 23.9 | 4.60 |
| 13* | −10.264 | 0.85 | | | 5.45 |
| 14 | ∞ | 1.10 | 1.51633 | 64.1 | 6.32 |
| 15 | ∞ | | | | 6.76 |
| IMAGE PLANE | ∞ | | | | |

ASPHERIC SURFACE DATA

1ST SURFACE

K = −8.84520e+001    A 4 = −2.25983e−004    A 6 = −1.20994e−005
A 8 = −2.80693e−007  A10 = 5.52510e−008     A12 = −1.34437e−009

2ND SURFACE

K = 1.38800e+001     A 4 = 1.09978e−005     A 6 = −3.05777e−005
A 8 = −1.7338e−008   A10 = 8.91102e−008     A12 = −3.02913e−009

3RD SURFACE

K = −4.66891e+000    A 4 = 8.62431e−004     A 6 = −3.37181e−005
A 8 = 1.49470e−006   A10 = −3.62389e−008    A12 = 1.72247e−010

4TH SURFACE

K = −7.81159e+001    A 4 = −3.58663e−004    A 6 = 1.52804e−005
A 8 = −1.376756e−006 A10 = 6.07857e−008     A12 = −6.35478e−010

5TH SURFACE

K = −8.99851e+001    A 4 = 5.44542e−004     A 6 = −9.90697e−005
A 8 = 4.84568e−006   A10 = −3.08535e−008    A12 = 7.53799e−009

6TH SURFACE

K = 5.14367e+000     A 4 = 1.14176e−003     A 6 = −8.98927e−005
A 8 = 9.07980e−006   A10 = −4.31174e−007    A12 = 2.16652e−008

8TH SURFACE

K = −1.79852e+000    A 4 = 1.59639e−003     A 6 = 1.78374e−004
A 8 = −1.65523e−004  A10 = 4.33873e−005     A12 = −4.19605e−006

9TH SURFACE

K = 4.95030e+000     A 4 = −9.83568e−004    A 6 = −4.45996e−004
A 8 = 9.93118e−007   A10 = 1.48074e−005     A12 = −3.26434e−006

10TH SURFACE

K = 8.99185e+001     A 4 = 8.54525e−004     A 6 = −2.71729e−004
A 8 = −1.18966e−005  A10 = 2.78388e−005     A12 = −4.20505e−006

11TH SURFACE

K = −8.99368e+001    A 4 = −4.17169e−004    A 6 = −2.11980e−004
A 8 = −5.86487e−005  A10 = 4.49926e−005     A12 = −5.01691e−006

12TH SURFACE

K = −1.10359e+001    A 4 = −3.52331e−002    A 6 = 8.48054e−003
A 8 = −2.56725e−003  A10 = 4.70979e−004     A12 = −3.30163e−005

13TH SURFACE

K = −4.78616e+001    A 4 = −1.23726e−002    A 6 = 1.97321e−003
A 8 = −4.10591e−004  A10 = 5.79107e−005     A12 = −3.07475e−006

VARIOUS DATA

| | |
|---|---|
| FOCAL LENGTH | 15.00 |
| F-NUMBER | 2.88 |
| HALF FIELD ANGLE | 11.68 |
| IMAGE HEIGHT | 3.10 |
| TOTAL LENS LENGTH | 20.75 |
| BF | 1.60 |
| ENTRANCE PUPIL POSITION | 9.21 |
| EXIT PUPIL POSITION | −5.77 |
| FRONT-SIDE PRINCIPAL POINT POSITION | −6.32 |
| REAR-SIDE PRINCIPAL POINT POSITION | −13.40 |

SINGLE LENS DATA

| LENS | INITIAL SURFACE | FOCAL LENGTH |
|---|---|---|
| 1 | 1 | −23.37 |
| 2 | 3 | 13.15 |
| 3 | 5 | 30.24 |
| 4 | 8 | 32.94 |
| 5 | 10 | 155.45 |
| 6 | 12 | −9.59 |
| 7 | 14 | 0.00 |

TABLE 1

| | EMBODIMENT 1 | EMBODIMENT 2 |
|---|---|---|
| CONDITION (EXPRESSION (4)) | 1.04 | 1.10 |

Each of the above-described embodiments enables, in the multi-lens optical apparatus including the multiple imaging optical systems whose focal lengths are mutually different, the wide-angle-side imaging optical system to have a wider field angle and a sufficient field of view.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-052919, filed on Mar. 17, 2014, which is hereby incorporated by reference wherein in its entirety.

What is claimed is:

1. A multi-lens optical apparatus comprising:
   multiple imaging optical systems configured to respectively form optical images of an object in mutually different areas on an image plane,
   wherein:
      the multiple imaging optical systems include imaging optical systems having mutually different focal lengths,
      each of the imaging optical systems includes a plurality of lenses,
      corresponding adjacent lenses of the plurality of lenses included in adjacent ones of the multiple imaging optical systems are integrally held such that a change in the position of one lens of the corresponding adjacent lenses causes a corresponding change in the position of other lenses of the corresponding adjacent lenses, the adjacent lenses being mutually adjacent in a direction orthogonal to optical axes of the multiple imaging optical systems, among the multiple imaging optical systems, a most wide-angle imaging optical system whose focal length is shortest includes a most object-side lens that is a meniscus lens having a negative optical power and having a convex surface toward an object side, and
      a most object-side point of the convex surface of the most wide-angle imaging optical system is disposed at a further object-side position than that of a most object side-lens surface of each other imaging optical system in the multiple imaging optical systems.

2. A multi-lens optical apparatus according to claim 1, wherein the adjacent lenses include at least two lenses formed of mutually identical materials and having mutually different surface shapes.

3. A multi-lens optical apparatus according to claim 1, wherein the adjacent lenses include at least two lenses formed of mutually identical materials and having refractive powers of mutually identical signs.

4. A multi-lens optical apparatus according to claim 1, wherein the adjacent lenses are integrally formed of mutually identical materials.

5. A multi-lens optical apparatus according to claim 1, wherein:

each of the imaging optical systems is constituted by at least three lenses, and among the adjacent lenses, at least one of at least two lenses whose lens surfaces have centers located at mutually different positions in a direction along the optical axes has a meniscus shape.

6. A multi-lens optical apparatus according to claim 1, wherein:

each of the imaging optical systems includes (a) a focus lens unit movable in a direction along the optical axis for focusing and (b) a fixed lens unit disposed on an image side further than the focus lens unit and being not moved during the focusing, and the following condition is satisfied when, among the imaging optical systems having the mutually different focal lengths, one imaging optical system having a shorter focal length is referred to as a wide-angle-side imaging optical system and another imaging optical system having a longer focal length is referred to as a telephoto-side imaging optical system:

$$0.8 < \frac{ES_W \cdot f_T^2}{ES_T \cdot f_W^2} < 1.2$$

where $f_W$ represents the focal length of the wide-angle-side imaging optical system, $\beta_{FW}$ represents a lateral magnification of the focus lens unit of the wide-angle-side imaging optical system, $\beta_{RW}$ represents a lateral magnification of the fixed lens unit of the wide-angle-side imaging optical system, $f_T$ represents the focal length of the telephoto-side imaging optical system, $\beta_{FT}$ represents a lateral magnification of the focus lens unit of the telephoto-side imaging optical system, and $\beta_{RT}$ represents a lateral magnification of the fixed lens unit of the telephoto-side imaging optical system.

7. A multi-lens optical apparatus according to claim 1, wherein the multiple imaging optical systems include imaging optical systems having mutually the same focal length.

8. A multi-lens optical apparatus according to claim 1, further comprising one of (a) an image sensor configured to photoelectrically convert the optical images respectively formed by the multiple imaging optical systems in its mutually different photoelectric conversion areas and (b) multiple image sensors configured to respectively photoelectrically convert the optical images.

9. A multi-lens optical apparatus according to claim 1, wherein a movement amount of the integrally-held adjacent lenses is equalized so that a focusing operation of one of the integrally-held adjacent lenses corresponding to one of the multiple imaging optical systems simultaneously moves the other of the integrally-held adjacent lenses corresponding to an adjacent imaging optical system to perform a focusing operation of the adjacent imaging optical system.

* * * * *